Nov. 7, 1961 V. W. BREITENSTEIN 3,007,720
BALL JOINT
Filed Aug. 10, 1959

Inventor.
Victor W. Breitenstein
Hofgren, Brady Wegner,
By Allen & Stellman
Attorneys.

United States Patent Office 3,007,720
Patented Nov. 7, 1961

3,007,720
BALL JOINT
Victor W. Breitenstein, Arlington Heights, Ill., assignor to Francis N. Bard
Filed Aug. 10, 1959, Ser. No. 832,649
2 Claims. (Cl. 285—268)

This invention relates to ball joints and in particular to ball joints for use at high temperatures.

When the conventional ball joint utilizing coaxially spaced annular gaskets to support the ball in the casing is used at high temperatures, as between 500° F. to 1500° F., the expansion of the ball has, at times, prevented the desired movement of the ball therein. This problem is aggravated where the joint also handles high pressures as substantial sealing forces between the ball and the gaskets must be provided.

A principal feature of the instant invention is the provision of a new and improved ball joint for use at high temperatures.

Another feature is the provision of such a ball joint including a frusto-conical spring urging the ball resiliently into sealed association with the retainer.

A further feature is the provision of such a ball joint wherein the spring is formed of resilient material having high tensile strength at high temperatures as 500° F. to 1500° F.

Still another feature is the provision of such a joint wherein the spring is provided with a plurality of circumferentially spaced slots extending longitudinally from the narrow end thereof.

Yet another feature is the provision of such a ball joint wherein the slots stop short of the portion of the spring engaging the ball.

A yet further feature is the provision of such a ball joint wherein the slot are provided with an enlarged generally circular end portion spaced from the narrow end of the spring.

Other features and advantages of the invention will be apparent from the following description taken in connection with the accompanying drawing wherein.

Figure 1:
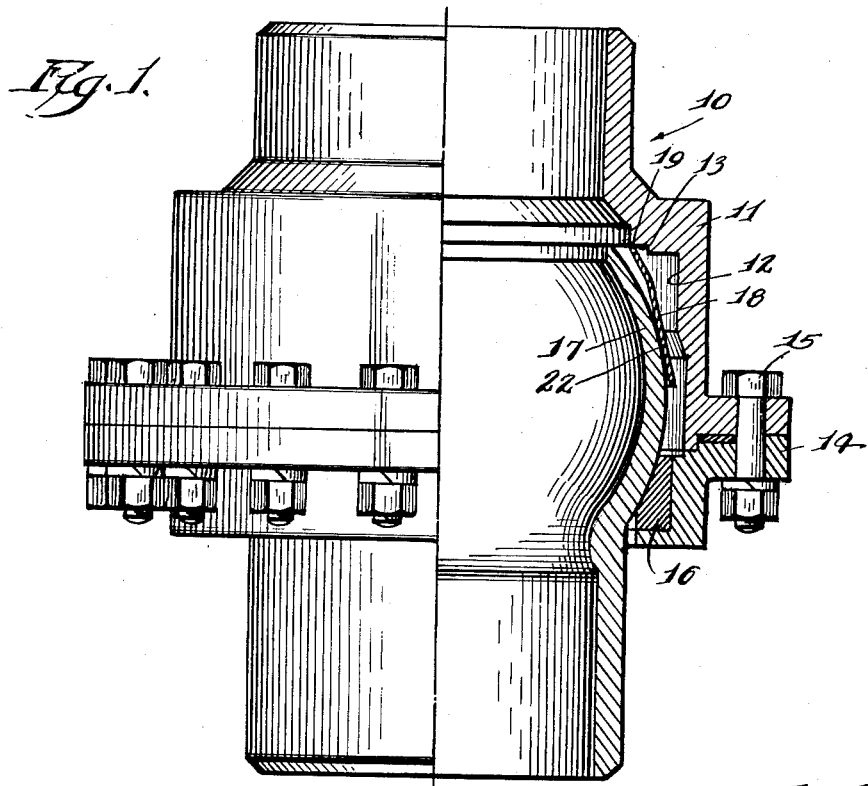
FIG. 1 is a view of a ball joint embodying the invention, the left portion thereof being shown in elevation, and the right portion thereof being shown in diametric section.
Figures 2, 3:
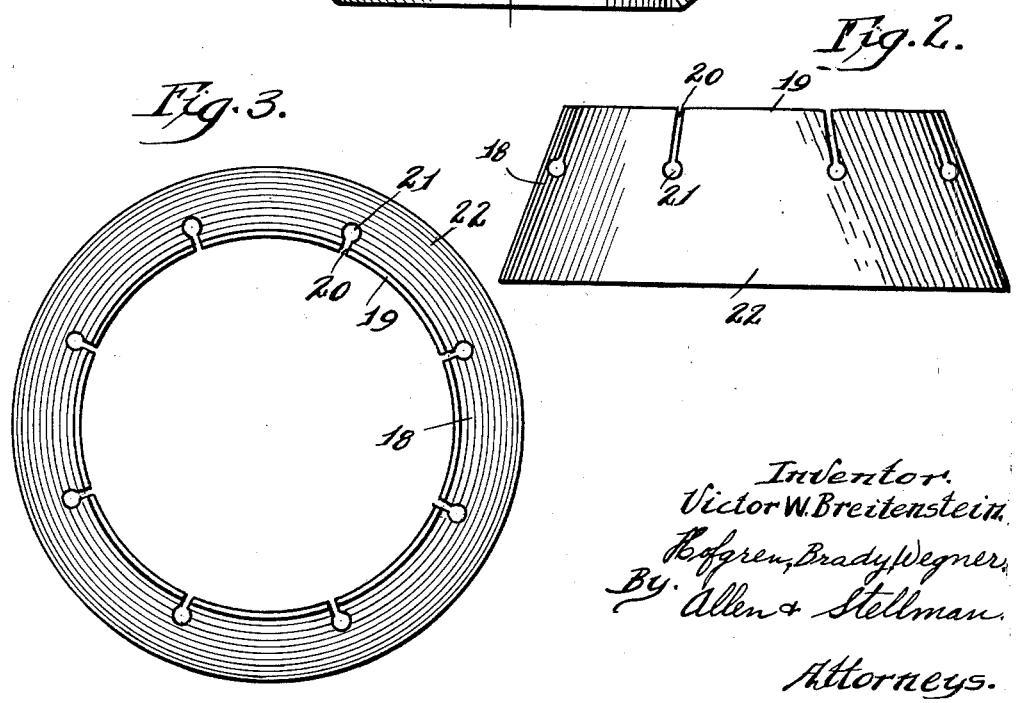
FIG. 2 is an elevation of the spring.
FIG. 3 is a plan of the spring.

As seen in FIG. 1, a ball joint generally designated 10 embodying the invention includes a casing 11 having a bore 12 therethrough provided with an annular radial shoulder 13. An annular retainer 14 is secured to one end of the casing by suitable means such as bolts 15 and is provided with an annular gasket 16 of conventional construction. A ball 17 is disposed in bore 12 to seat movably on gasket 16.

The ball is urged resiliently into sealing engagement with gasket 16 by a frusto-conical spring 18 having a narrow end 19 seating on radial shoulder 13 of the casing. The spring is formed of a material having high tensile strength at high temperatures, as 500° F. to 1500° F., such as stainless steel. To facilitate suitable flexing of the spring, the spring is provided with a plurality of slots 20 extending longitudinally from narrow end 19 and generally circularly enlarged at their inner ends 21 to preclude stress formations in the spring. The slots extend only partially the length of the spring, herein less than one-half the length, to permit the ball 17 to engage an unslotted outer portion 22 of the spring.

Spring 18 preloads the gasket by applying a suitable force to urge ball 17 resiliently thereagainst. The rigidity of the frusto-conical spring structure permits a high sealing pressure to be developed while yet the resiliency of the spring precludes locking of the ball at high temperatures. Thus, gasket 16 may be formed of a wide variety of suitable sealing materials or may be eliminated to have ball 17 seat directly on the retainer 14.

While I have shown and described one embodiment of my invention, it is to be understood that it is capable of many modifications. Changes, therefore, in the construction and arrangement may be made without departing from the spirit and scope of the invention as defined in the appended claims.

I claim:

1. A joint comprising: a casing having an internal radial shoulder; a ball in the casing; an annular retainer on the casing retaining the ball against movement in one direction away from the shoulder of the casing; and a frusto-conical spring in the casing, said spring having its narrow end seated on the casing shoulder and widening in said one direction to engage the ball and urge it resiliently into sealed association with said retainer, said spring having its wide end spaced from the casing.

2. A joint comprising: a casing; a ball in the casing; an annular retainer on the casing retaining the ball against movement in one direction from the casing; and a frusto-conical spring having its narrow end seated on the casing and widening in said one direction to engage the ball and urge it resiliently into sealed association with said retainer, said spring having a plurality of circumferentially spaced slots extending longitudinally from said narrow end, each slot having an enlarged, generally circular end portion spaced from the narrow end of the spring.

References Cited in the file of this patent
UNITED STATES PATENTS

| | | |
|---|---|---|
| 862,994 | Phillips | Aug. 13, 1907 |
| 866,061 | Phillips | Sept. 17, 1907 |
| 2,182,601 | Venditty | Dec. 5, 1939 |
| 2,838,330 | Fidler | June 10, 1958 |